United States Patent
Stempinski et al.

(10) Patent No.: US 7,041,898 B2
(45) Date of Patent: May 9, 2006

(54) QUARTER ROUND PLASTIC EXTRUDED RACEWAY

(75) Inventors: Shawn Stempinski, Wethersfield, CT (US); Peter Currier, Torrington, CT (US); Antonio J. Vargas, Tolland, CT (US)

(73) Assignee: The Wiremold Company, West Hartford, CT (US)

( * ) Notice: Subject to any disclaimer, the term of this patent is extended or adjusted under 35 U.S.C. 154(b) by 0 days.

(21) Appl. No.: 10/965,330

(22) Filed: Oct. 14, 2004

(65) Prior Publication Data

US 2005/0167143 A1    Aug. 4, 2005

Related U.S. Application Data

(60) Provisional application No. 60/514,693, filed on Oct. 27, 2003.

(51) Int. Cl.
*H02G 3/04* (2006.01)

(52) U.S. Cl. .............. 174/48; 174/68.1; 174/68.3; 174/135; 52/220.1; 439/207

(58) Field of Classification Search ............ 174/48, 174/49, 68.1, 68.3, 97, 47, 135, 72 A, 72 C, 174/96; 439/207; 52/220.1, 220.5
See application file for complete search history.

(56) References Cited

U.S. PATENT DOCUMENTS 5,732,747 A * 3/1998 Holliday .................. 138/163
6,344,611 B1 * 2/2002 Ewer et al. ................ 174/48

* cited by examiner

*Primary Examiner*—Dhiru R. Patel
(74) *Attorney, Agent, or Firm*—McCormick, Paulding & Huber LLP

(57) ABSTRACT

Cornice Molding raceway including a generally U-shaped base and reversible cover that can be used to expose differently shaped surfaces to allow different design variations for the installer.

4 Claims, 3 Drawing Sheets

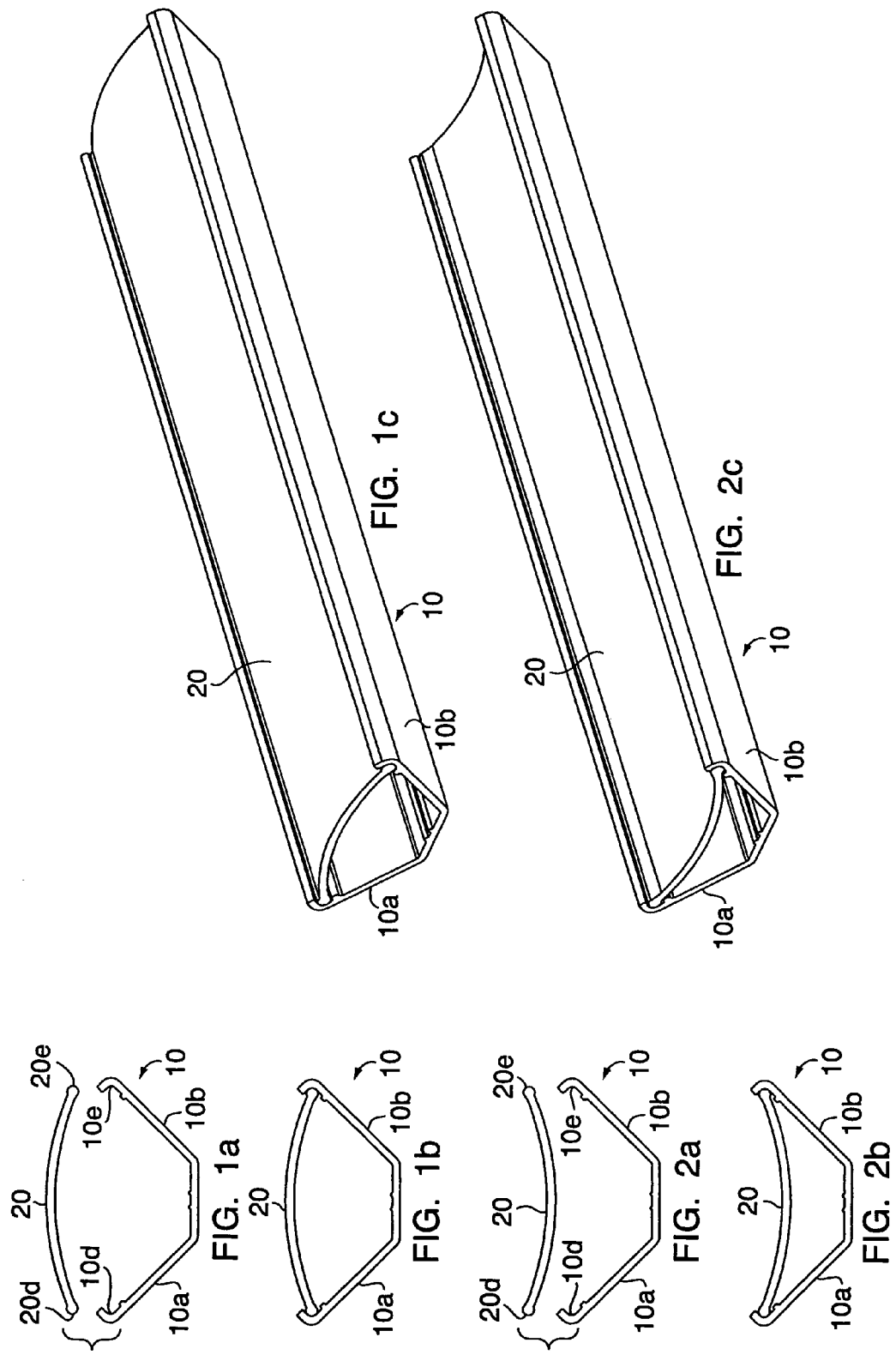

QUARTER ROUND PLASTIC EXTRUDED RACEWAY

CROSS REFERENCE TO RELATED APPLICATIONS

This application is related to an earlier filed Provisional Application Ser. No: 60/514,693 filed Oct. 27, 2003 entitled "Quarter Round Plastic Extruded Raceway" priority to which is claimed, and which is incorporated by reference herein.

The present invention relates to a quarter round plastic raceway for use at a corner, and that can be fabricated from a polymeric material, and designed for use by the homeowner as a result of the minimal expertise required to cut and install the raceway components.

BACKGROUND OF THE INVENTION

Although raceways have been available for use in a corner, that is between a wall and a ceiling, and between 90° walls, such raceways have in the past had corners that are of a particular form dictated by the respective shapes of the raceway base. See for example European Patent No. 600, 108 wherein a convex cover is hingedly connected to one side of the raceway base, is that the opposite side of the cover can be snapped in place after providing the wiring or cables therein.

In another European Patent, No. 887,903, a corner raceway is shown having a generally flat cover, with flared marginal edges and depending ribs adapted to be received in grooves provided along the marginal edges of the base sidewalls.

SUMMARY OF THE INVENTION

The present invention relates to a corner or quarter round raceway having a base somewhat similar to those disclosed in the above-mentioned prior art patents, but instead of a conventional raceway cover, the cover of the present invention is designed to be received with either the concave face exposed or with the convex face exposed, to provide variations in the raceway appearance and in the cross-sectional shape of the raceway, without requiring an additional cover for achieving these ends. In further accordance with the present invention the raceway can be joined with a unique 90° elbow connector fitting designed to accommodate the raceway and its cover in at least one of these two orientations.

Finally, the raceway can also be joined to raceways of different configurations by use of connector fittings of elbow shape or T-shape.

BRIEF DESCRIPTION OF THE DRAWINGS

FIGS. 1a, 1b and 1c illustrate one assembly that can be made with the raceway components of the present invention to provide a corner raceway having a convex appearance.

FIGS. 2a, 2b and 2c show the same components assembled in a different fashion to afford a raceway of convex configuration.

DETAILED DESCRIPTION OF THE DRAWINGS

Figure 1D:
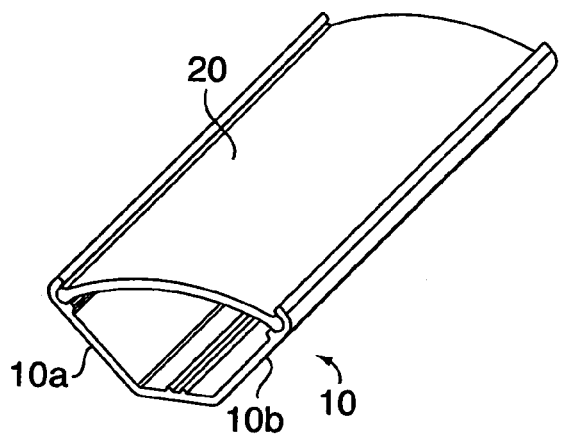
FIGS. 1d and 2d illustrate the raceway assemblies from a slightly different vantage point.

The quarter round corner raceway of the present invention is intended for use between a wall and a ceiling or in the corner of a room, and includes a generally U-shaped raceway base 10 having each of the sidewalls of the base 10a and 10b oriented at approximately 45° to the raceway base 10c. This generally narrow flat base segment 10c parallel to the outer marginal edges of the base sidewalls, 10a and 10b, and more particularly to the plane defined by these parallel marginal edges. These marginal edges of the base sidewalls define inwardly facing elongated grooves 10d and 10e.

Figure 2D:
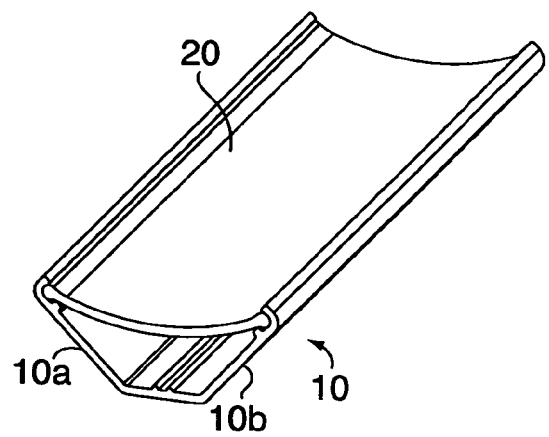
Figure 1E:
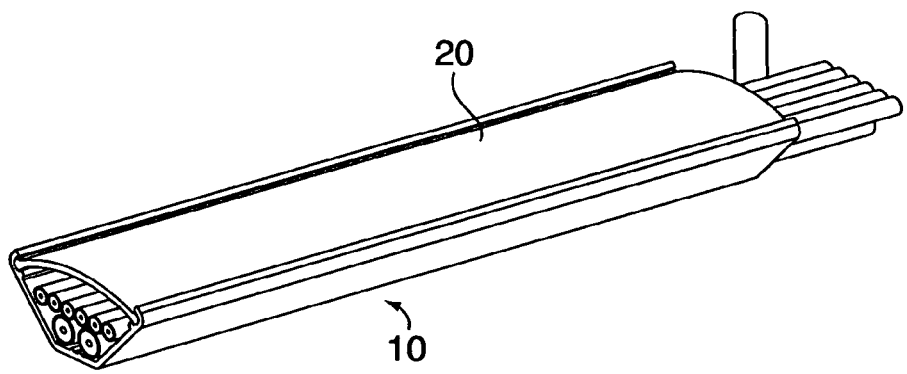
FIGS. 1e and 2e illustrate the raceways of FIGS. 1 and 2 having cables or wires provided therein. It will be apparent that the concave raceway configuration of FIG. 1 accommodates a larger number of wires than the convex raceway of FIG. 2.

The cover 20 has its marginal edges 20d and 20e so configured as to be received in these grooves 10d and 10e, respectively or to instead be received in an opposite fashion as shown in FIG. 2a in order to provide a completely different raceway configuration with the same components (compare FIGS. 1c and 2c).

Thus, the base 10 and the cover 20 are symmetrical about a plane oriented perpendicular to the base of the assembled raceway, and relative to the elongated marginal edges of the raceway base sidewalls. This geometry allows the cover to be reversed so that the cover can be provided with the exposed outer surface of the cover being either concave or convex side as shown in FIGS. 1c and 2c, respectively. Thus, the arcuate cross sectional shape of the cover 20 is an important feature of the present invention. It will be apparent to those skilled in the art that the same principle can be applied to a raceway adapted to run along the surface of a vertical wall or perhaps along a horizontal ceiling or floor. However, the inherent resiliency of the sidewalls is especially important to the corner configuration.

It will also be apparent that the arcuate configuration shown can be varied somewhat so as to afford a different appearance and hence a different cross sectional area for the raceway. However, utilizing the generally circular arcuate shape shown is the preferred embodiment. Nevertheless, providing some other faceted raceway shapes is within the scope of the invention. The terms convex and concave are intended to convey the concept of a raceway cover having a contour adapted to afford different raceway cross sectional shapes and appearances. The advantages of the present invention can therefore be realized as long as one surface be so shaped as to reduce the cross sectional area within the raceway and opposite surface to maximize that cross sectional area. An important feature is providing marginal edges for the raceway cover that fit grooves in the marginal edges of the base in either one orientation of the cover or in the opposite orientation thereof.

Figure 3:
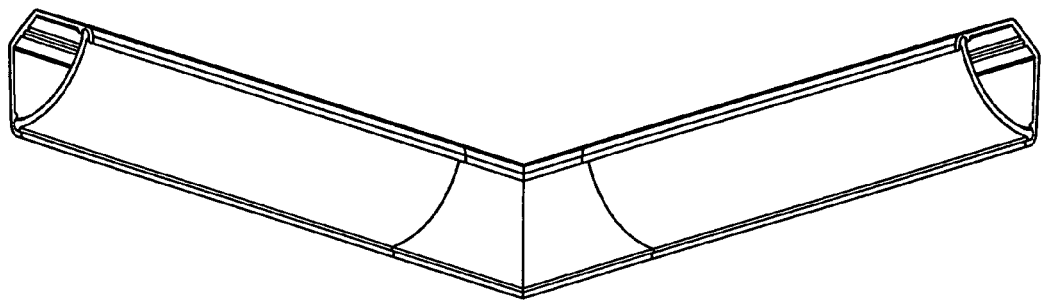
FIG. 3 illustrates the raceway of FIG. 1, that is with the concave shape, having a 90° elbow provided between the ends of the raceways.

Raceway fittings can be provided for joining adjacent raceway base segments, and these fittings can be designed with either convex or concave contour to match the preferred orientation of the cover in the base. See FIG. 3 for example.

Figure 4:
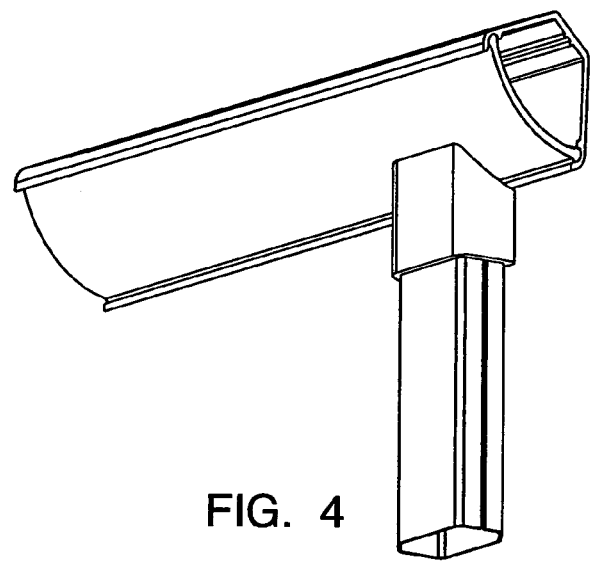
FIG. 4 shows the same raceway of FIGS. 1 and 3 with a fitting suitable for accommodating a generally rectangular one-piece raceway.

Finally, FIG. 4 shows a fitting that allows mating of a polymeric raceway of different configuration to the raceway of the present invention in a "T" fitting.

Additional adapters can be provided for accommodating the raceway cover and the base of the present invention at one end, and for fitting other raceway configurations at an opposite end or in a T-shaped configurations such as shown in FIG. 4.

Finally, one might also provide the convex raceway of the invention at the junctions between a wall and a ceiling (as in the nature of a cornice molding). The same raceway with the cover reversed can be provided for traversing the corner of the same room and a fitting of combination T-shaped, and elbow shaped, with convex end fittings at the top, and with a concave shape at he base of the T, for such an installation.

Figure 2E:
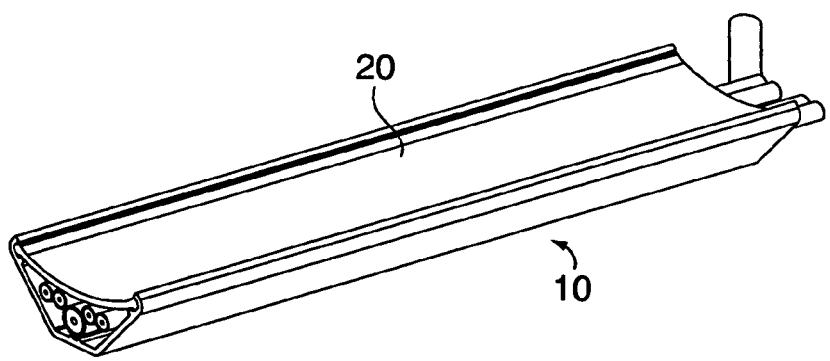

It should perhaps be noted that with the concave side of the cover exposed as shown in FIG. 2e the wire capacity of the raceway is substantially increased over that afforded with the convex side of the cover exposed as shown in FIG. 2e.

In light of the above, it is therefore understood that within the scope of the appended claims, the invention may be practiced otherwise than as specifically described.

The invention claimed is:

1. A raceway for use between a wall and a ceiling, or for use at the corner of a room, and comprising:
   a generally U-shaped elongated raceway base having resiliently deformable sidewalls integrally connected to the base of the U, and oriented at substantially 45° to the base of the U, said elongated raceway base sidewalls having marginal edge portions defining grooves that open inwardly and extend the length of the U-shaped elongated raceway base, and
   an elongated reversible cover for the base, said cover being generally coextensive with said base, said cover having marginal edge portions being designed to be received with either in one orientation and an opposite orientation to said grooves for being received in said grooves of said raceway base as a result of said resiliently deformable side walls so as to expose either the inside or the outside surface of said cover, said outside and inside cover surfaces being different from one another to provide distinctly different raceway appearances depending upon the orientation of said cover when so assembled with said base.

2. The raceway according to claim 1 wherein said cover has a contour such that the cross sectional area defined between the raceway base and the cover can vary depending upon the orientation of said cover in said raceway base.

3. The combination according to claim 1 or 2 further characterized by fittings for accommodating adjacent raceway bases, said fittings being of matching shape to that of said raceway base and cover cross section, some fittings serving to couple adjacent assembled raceway covers.

4. The combination according to claim 1 or 2 further characterized by fittings for accommodating adjacent 'raceway bases, said fittings being of matching shape to that of said raceway base and cover cross section, other fittings serving to couple one assembled raceway base and cover to a raceway of different geometry.

* * * * *